Aug. 2, 1927.  1,637,532
W. H. OLIVER ET AL
MOLD FOR FORMING CONTAINERS
Filed Nov. 22, 1923   4 Sheets-Sheet 2
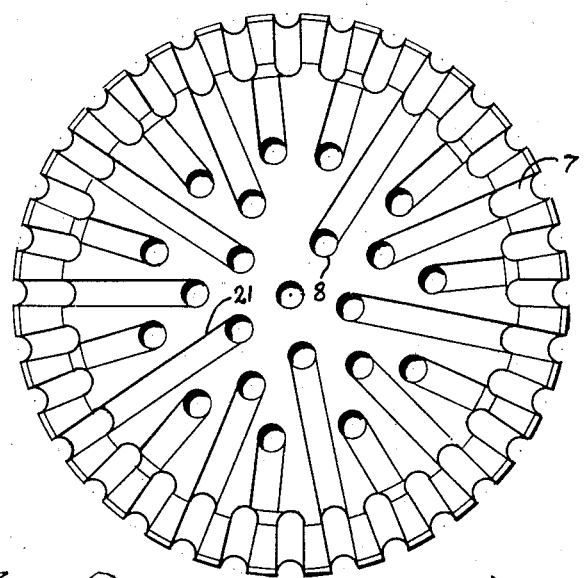
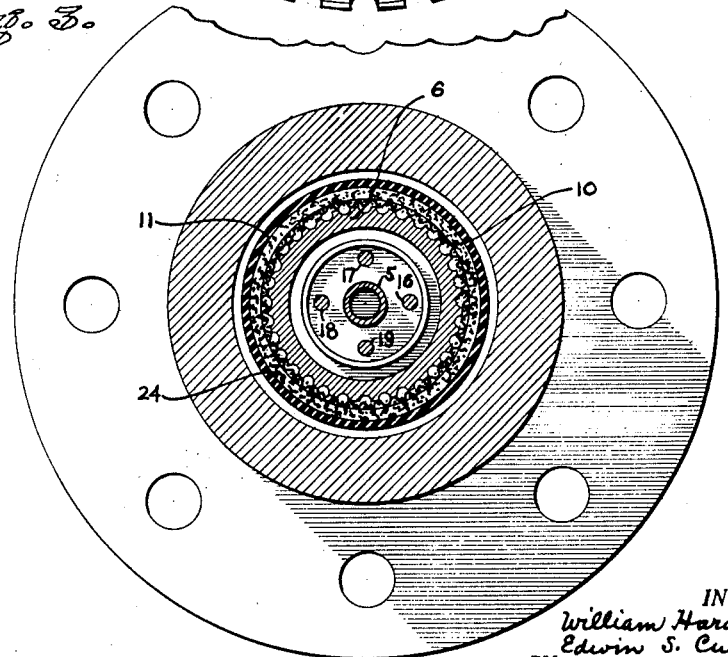
INVENTORS:
William Harold Oliver
Edwin S. Culver
BY: A W Boyken
Their ATTORNEY

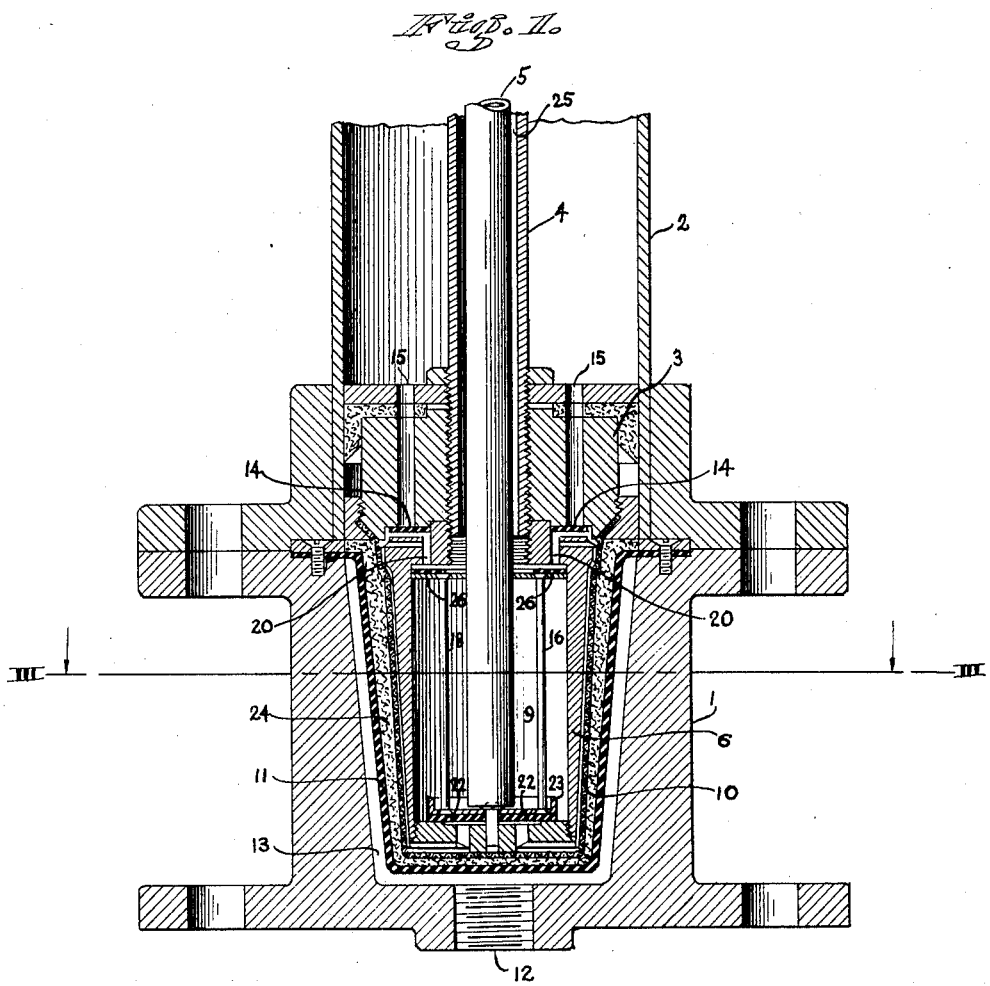

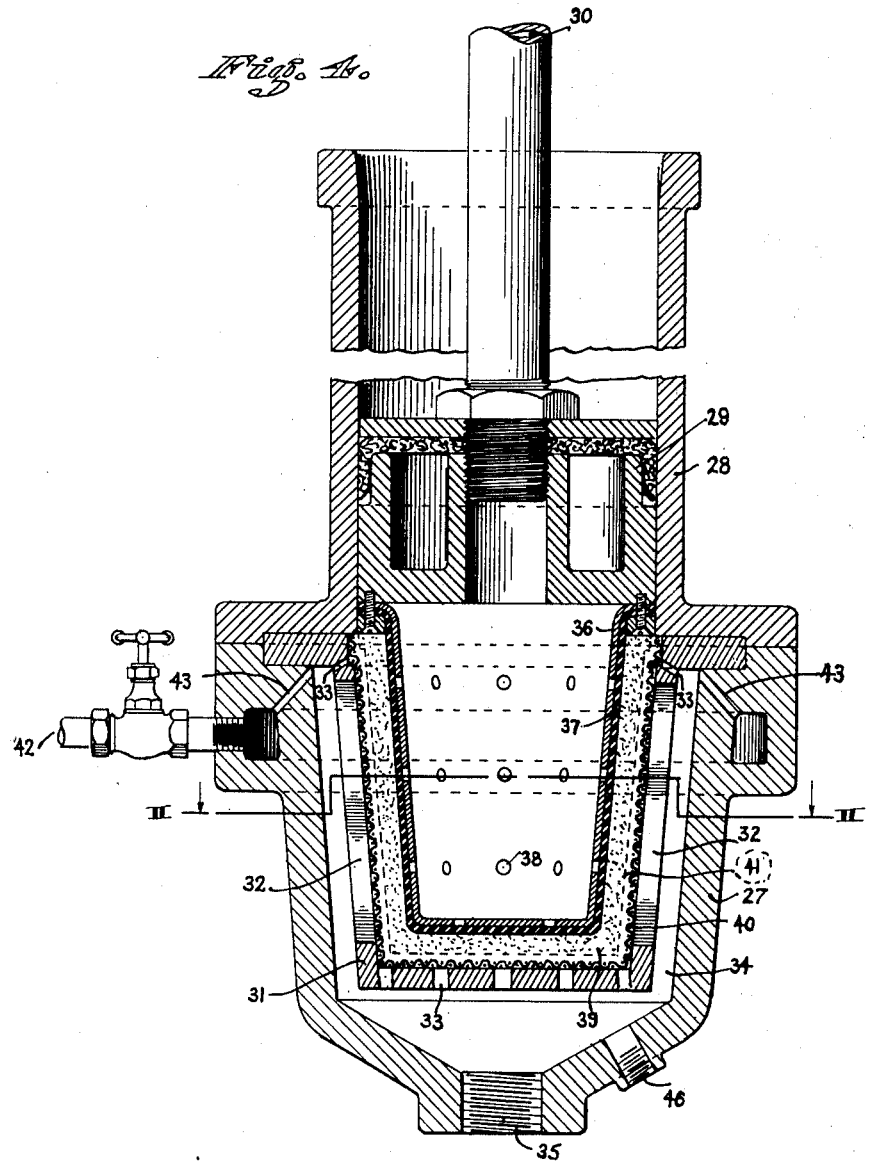

Aug. 2, 1927.
W. H. OLIVER ET AL
1,637,532
MOLD FOR FORMING CONTAINERS
Filed Nov. 22, 1923
4 Sheets-Sheet 4
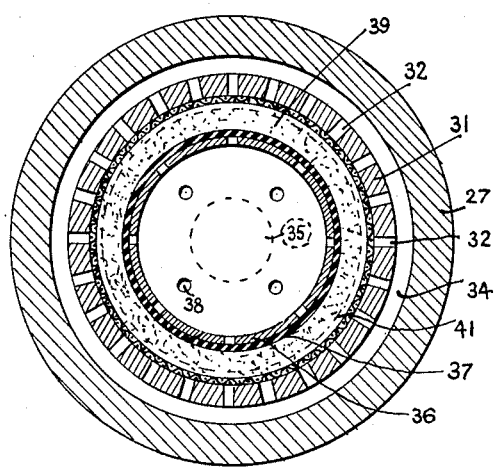
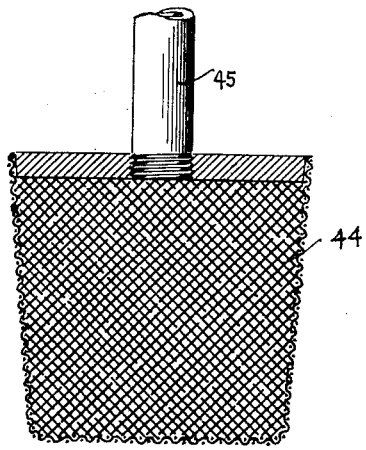
INVENTORS:
William Harold Oliver
Edwin S. Culver
BY: A. W. Boyken
Their ATTORNEY Patented Aug. 2, 1927.

1,637,532

UNITED STATES PATENT OFFICE.

WILLIAM HAROLD OLIVER AND EDWIN S. CULVER, OF OAKLAND, CALIFORNIA.

MOLD FOR FORMING CONTAINERS.

Application filed November 22, 1923. Serial No. 676,232.

Our invention relates to an improved mold whereby containers may be formed from wood pulp or other suitable material.

The principal object of our invention is to rapidly form containers which may have either a constant or variable thickness, and which will be properly drained and pressed to retain their form when removed from the mold.

A further object is a mold so constructed that surplus water is pressed from the pulp, during which process the fibers in the pulp will interlay or felt as the water is being removed.

Another object is a mold in which surplus water, as it is pressed from the pulp, is swept away from the compressed surface by a current of air and thus picked up and removed out of contact with the adjacent container surface.

Another object is a mold in which a flexible or rubber diaphragm is used in forming the container.

Other objects will appear from the drawings and specification which follow.

Figure 1 is a cross section through one form of mold built in accordance with our invention.

Fig. 2 is a bottom view of the core, within said mold.

Fig. 3 is a cross section of Fig. 1 on the line III—III thereof.

Fig. 4 is a cross section through another form of mold built in accordance with our invention.

Fig. 5 is a cross section of Fig. 4 on the line II—II thereof.

Fig. 6 is a section through our extractor employed in removing the container from the mold shown in Fig. 4 and Fig. 5.

Referring to the mold shown in Figs. 1, 2 and 3, an outer casing or body portion of the mold is shown at 1, to which pulp is supplied by the cylindrical filling chamber 2 carrying the conventional piston 3 to which is attached the hollow piston rod 4 and within which rod is the pipe connection 5 extending through the piston 3 into a core 6 which is attached to the lower end of said piston. The core 6 has outer side channels 7 and bottom ports 8 and channels 21 communicating with a central compartment 9. Surrounding the outer channelled surface of the core and likewise attached to the piston, is a screen 10. At 11 is shown a flexible diaphragm which may be made of rubber or other suitable material, said diaphragm being positioned within the body portion 1 and exterior to said core 6 and screen 10.

In making a container, the piston 3 to which is attached core 6 and screen 10, together with all parts within said core is raised up and out of filling chamber 2. A vacuum or negative pressure is then applied through opening 12 into the chamber 13, which draws the flexible diaphragm 11 against the interior walls of the body portion 1. A predetermined quantity of pulp of suitable material and consistency, but usually in a comparatively fluid state is admitted through the filling chamber 2 into the expanded flexible diaphragm 11. The piston 3 with its attached parts is then pushed by some suitable means down filling chamber 2 to a predetermined point, as shown in Fig. 1.

During the downward movement of piston 3 a vacuum or negative pressure is applied to the central compartment 9 of the core 6 through the pipe connection 5 within the piston rod 4. The pressure caused by the downward movement of the piston 3, together with the negative pressure within the compartment 9 causes water from the pulp 24 to be forced through the screen 10 into the channels 7 of the core 6. Suitable flexible valves 14 are depressed due to the unbalanced pressures which valves admit atmospheric air from the open space in filling chamber 2 above the piston 3 through passages 15 into the channels 7 in the core. Also due to unbalanced pressures the valve mechanism 16, 17, 18, 19 is raised so as to seal ports 20 by valves 26.

The atmospheric air rushes down channels 7 in back of screen 10 sweeping away the water forced through the screen and carrying it in channels 7 and bottom channels 21 through connecting ports 8, around lower valves 22 (also a portion of valve mechanism 16, 17, 18 and 19), and over valve lip 23 and thence up through pipe 5.

After the piston 3 has reached the position shown in Fig. 1, the negative pressure is discontinued through opening 12 and instead positive pressure admitted through said opening into the chamber 13. This positive pressure causes the flexible diaphragm 11 to further squeeze the pulp 24 towards the screen 10, until said diaphragm reaches the position shown in Fig. 1. The continued rush of air through passages 15 and channels 7 carries away with it all water remaining in the mesh of the screen or channels. In the meanwhile the material suspended in the liquid of the pulp has been laid up against the screen 10 in such a way that the fibers will interlay or felt.

After a suitable length of time, the positive pressure maintained in chamber 13 is released and a negative pressure applied which causes the flexible diaphragm 11 to resume its former position against the interior walls of the body of the mold. Piston 3, with negative pressure still applied to the interior chamber 9 of core 6, is raised up and out of the filling chamber 2. The negative pressure applied through the pipe 5 is then released which causes valves 22 to drop, sealing ports 8.

A positive pressure is then admitted through the inner passage 25 of the piston rod 4 into the central chamber 9 of the core 6. Due to unbalanced pressures the valves seal the passages 15 and a positive pressure is built up within the central chamber of the core, thereby causing the finished container to be released from the screen 10 and dropped onto a suitable conveyor. After the container has been so released a greater pressure may be admitted through the passage 25 to the inside of the core, thereby removing any dirt or small fiber which may have collected in the screen 10 or channels 7 and 21.

Slight variations may be made without departing from the scope of our invention, as for instance the ports 20 may be at other places than shown and the valves 22 and 26 may be omitted altogether. It will also be understood that the form of mold may vary so that containers of any suitable shape may be made, and that the diaphragm may be of rubber, silk or various other materials. Likewise the screen may be of the ordinary mesh variety of any material or otherwise perforated.

In Figs. 1, 2, and 3, we have shown the flexible diaphragm squeezing the pulp towards the screened core, whereas in Figs. 4 and 5 the flexible diaphragm is shown squeezing the pulp away from the outside of the core and toward the inside of the screen. In the former figures the diaphragm is shown outside, and the screen inside the container, whereas in the latter figures the diaphragm is shown inside and the screen outside the container, a mere change in location.

In Fig. 4 the body portion of the mold is shown at 27 to which pulp is supplied by a similar filling chamber 28, to that shown in Fig. 1, and within which chamber the conventional piston 29 and hollow piston rod 30 operate. Mounted with the body portion 27 is a screen supporting mold 31 having a plurality of openings which may be in the form of long slots 32 with top and bottom ports 33 communicating with a suitably sized chamber 34 surrounding the mold 31 so that liquid may be drained through opening 35 at the bottom of the body portion as by a vacuum pump not shown but well known.

The core is shown at 36 about the outer surface of which normally reposes the flexible diaphragm 37, the core and diaphragm being fixed to the piston. The core has a plurality of holes 38 whereby pressure may be exerted against the diaphragm to cause the latter to expand against the pulp.

In the operation of the mold shown in Figs. 4 and 5, a measured quantity of pulp enters the screen supporting mold after which the piston carrying the core and diaphragm is forced downward through the pulp 39 until it reaches the position shown in Fig. 4. During this downward movement of the piston, liquid is pressed out of the pulp, through the screen 40 and drained through the slots 32 and ports 33, while the material suspended in said liquid will be laid up against the screen, allowing the fibers to interlay or felt. During this step of the process a negative pressure may be applied through opening 35 to chamber 34.

After the piston has reached the position shown in Fig. 4 the flexible diaphragm is expanded by the application of positive pressure entering the center of the core through the hollow piston stem and transmitted to the diaphragm through the perforations 38. The expanding diaphragm will squeeze the pulp so that the inner surface thereof will assume the position indicated by the dotted line 41. This squeezing action will force additional liquid into the chamber 34 which is withdrawn through outlet 35. A negative pressure may also be applied through outlet 35 either before, simultaneously with, or after the pressure has been applied through the piston rod as the pulp used for making the container requires, and the application of such negative pressure is for the purpose of removing as much of the remaining liquid as possible.

By means of an inlet 42 and passages 43, a current of air is created which rushes down through the chamber 34 past slots 32 and ports 33 and across the exposed areas of the screen through all these openings, causing some of the liquid in the ports and slots to evaporate, but also sweeping away a larger portion which might otherwise remain therein through capillary attraction.

After a predetermined length of time the positive pressure applied through the piston rod is discontinued so that the diaphragm is released from the interior of the container and resumes its normal position. The negative pressure through the chamber 34 may also be discontinued. The piston unit with the core and diaphragm are removed leaving the squeezed container within the screen and supporting mold.

The extractor shown in Fig. 6 is then inserted so that the outer surface of its mesh 44 is in contact with the inner surface of the container and a negative pressure applied through stem 45 and a positive low pressure or puff applied to chamber 34 through connection 46, which puff releases the container from the surface of the screen. The extractor is removed, with the container held thereto by means of the still applied negative pressure, and the container finally is released from the extractor by discontinuing this negative pressure and the application of low pressure air through the stem.

While we have shown two variations of our invention, other forms will suggest themselves to those who are skilled in this art, without departing from the gist of our invention, and we desire to be understood as claiming all such variations.

We claim:

1. The process of forming containers or the like which consists of introducing pulp in a mold member, inserting a core member within said pulp, squeezing the pulp by means of a flexible diaphragm adjacent one of said members in the direction of the other member, carrying away the surplus liquid squeezed from the pulp by a current of air passing through drainage means in the member toward which the pulp has been squeezed.

2. The process of forming containers or the like which consists in introducing pulp between a relatively rigid and perforated concave member and a flexible diaphragm, transmitting pressure against said diaphragm so as to squeeze the pulp against the inner walls of said relatively rigid member, releasing the pressure and removing said diaphragm, inserting an extractor and introducing pressure through the perforations of said relatively rigid member, and negative pressure from said extractor for the purpose of removing said container from the concave member.

3. The process of forming containers or the like which consists of introducing pulp in a mold member, inserting a relatively rigid core member within said pulp, squeezing said pulp in the direction of one of said members by means of a flexible diaphragm against which pressure has been conveyed, draining the surplus liquid from said pulp, releasing the pressure against the flexible diaphragm and introducing positive counter pressure against the opposite side of said container to liberate the molded container.

4. The process of forming containers or the like which consists of introducing pulp in a mold member, inserting a relatively rigid core member within said pulp, squeezing said pulp in the direction of one of said members by means of a flexible diaphragm against which pressure has been conveyed, draining the surplus liquid from said pulp, by a current of air passing through drainage means in the member toward which the pulp has been squeezed, releasing the pressure aginst the flexible diaphragm and introducing positive counter pressure aginst the opposite side of said container to liberate the molded container.

5. In a mold for forming containers and the like from wet pulp, a mold member having a plurality of drainage ports for draining moisture from the pulp being molded, a perforated form in spaced relation to said mold member, a screen against said mold member, a flexible diaphragm normally spaced from said screen, means for directing pressure through the perforations of said form, an outlet connection from said drainage ports, and means for conveying a current of air along said drainage ports to said outlet connection.

WILLIAM HAROLD OLIVER.
EDWIN S. CULVER.